United States Patent
Aaron et al.

(10) Patent No.: US 10,404,986 B2
(45) Date of Patent: Sep. 3, 2019

(54) TECHNIQUES FOR OPTIMIZING BITRATES AND RESOLUTIONS DURING ENCODING

(71) Applicant: NETFLIX, Inc, Los Gatos, CA (US)

(72) Inventors: Anne Aaron, Menlo Park, CA (US); David Ronca, Campbell, CA (US); Ioannis Katsavounidis, Los Angeles, CA (US); Andy Schuler, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 502 days.

(21) Appl. No.: 14/673,621

(22) Filed: Mar. 30, 2015

(65) Prior Publication Data

US 2016/0295216 A1 Oct. 6, 2016

(51) Int. Cl.
*H04N 19/146* (2014.01)
*H04N 19/124* (2014.01)
(Continued)

(52) U.S. Cl.
CPC ......... *H04N 19/146* (2014.11); *H04N 19/124* (2014.11); *H04N 19/154* (2014.11); *H04N 21/23418* (2013.01); *H04N 21/23439* (2013.01)

(58) Field of Classification Search
None
See application file for complete search history.

(56) References Cited

U.S. PATENT DOCUMENTS 5,612,900 A * 3/1997 Azadegan ............ G11B 27/031
375/E7.088
8,743,954 B1 6/2014 Masterson
(Continued)

FOREIGN PATENT DOCUMENTS

CN 1848964 A 10/2006
CN 102428702 A 4/2012
(Continued)

OTHER PUBLICATIONS

Hervouet et al., "Video Quality Optimization—Multi-rate Video Encoding: Best Practices Recommendations for Optimized Encoding Resolution Contents," Jul. 1, 2010 (Jul. 1, 2010), XP055272436 (Year: 2010).*

(Continued)

*Primary Examiner* — William C Vaughn, Jr.
*Assistant Examiner* — Stuart D Bennett
(74) *Attorney, Agent, or Firm* — Artegis Law Group, LLP (57) ABSTRACT

In one embodiment of the present invention, an encoding bitrate ladder selector tailors bitrate ladders to the complexity of source data. Upon receiving source data, a complexity analyzer configures an encoder to repeatedly encode the source data-setting a constant quantization parameter to a different value for each encode. The complexity analyzer processes the encoding results to determine an equation that relates a visual quality metric to an encoding bitrate. The bucketing unit solves this equation to estimate a bucketing bitrate at a predetermined value of the visual quality metric. Based on the bucketing bitrate, the bucketing unit assigns the source data to a complexity bucket having an associated, predetermined bitrate ladder. Advantageously, sagaciously selecting the bitrate ladder enables encoding that optimally reflects tradeoffs between quality and resources (e.g., storage and bandwidth) across a variety of source data types instead of a single, "typical" source data type.

18 Claims, 6 Drawing Sheets

(51) Int. Cl.
*H04N 19/154* (2014.01)
*H04N 21/234* (2011.01)
*H04N 21/2343* (2011.01)

(56) References Cited

U.S. PATENT DOCUMENTS

| | | | |
|---|---|---|---|
| 8,767,825 B1 | 7/2014 | Wang et al. | |
| 2003/0053416 A1* | 3/2003 | Ribas-Corbera | H04N 19/172 370/233 |
| 2009/0310673 A1 | 12/2009 | Chung | |
| 2012/0147958 A1* | 6/2012 | Ronca | H04N 19/124 375/240.16 |

FOREIGN PATENT DOCUMENTS

| | | |
|---|---|---|
| CN | 102792687 A | 11/2012 |
| JP | H09-121348 A | 5/1997 |
| WO | 2012078965 A1 | 6/2012 |
| WO | 2015/183910 A1 | 12/2015 |
| WO | 2016/130318 A1 | 8/2016 |

OTHER PUBLICATIONS

Sonnati, "Encoding for performance on multiple devices," Oct. 5, 2011 (Oct. 5, 2011), XP055272247 (Year: 2011).*

Sun, et al., "Comparing Subjective Perceived Quality with Objective Video Quality by Content Characteristics and Bit Rates", IEEE International Conference on New Trends in Information and Service Science, Jun. 30-Jul. 2, 2009, Beijing, China (Year: 2009).*

International Search Report for Application No. PCT/US2016/021649, 14 pages.

Fabio Sonnat i : 11 Encoding for performance on multiple devices, Oct. 5, 2011 (Oct. 5, 2011). XP055272247, Retrieved from the Internet : URL:http ://www .progettos i nergia.com/flashv ideo/ finalMAX2011.pdf [retrieved on May 12, 2016] slides 25-30.

G Hervouet et al: "Video Quality Optimization—Multi-rate Video Encoding: Best Practices Reco1TTT1endations for Optimized Encoding Resolution Contents", Jul. 1, 2010 (Jul. 1, 2010), XP055272436, Retrieved from the Internet : URL:http://telcogroup.ru/files/materials-pdf /DVB standards/IPTV/wp multi res encoding.pdf—[retrieved on May 12, 2016] the whole document.

Laura Toni et al: "Optimal set of video representations in adaptive streaming", Proceedings of the 5th ACM Multimedia Systems Conference on, MMSYS 114, Jan. 1, 2014 (Jan. 1, 2014), pp. 271-282 , XP055272306, New York, New York, USA DOI: 10 .1145/2557642.2557652 ISBN: 978-1-4503-2705-3 abstract section 6: 11 Guidelines.

Anne Aaron et al: "Per-Title Encode Optimization", Dec. 14, 2015 (Dec. 14, 2015). XP055272350, Retrieved from the Internet : URL:http://techblog.netfli x. com/2015/ 12/per-title-encode-optimization.html [retrieved on May 12, 2016] the whole document.

Average SNR Differences Between RD-Curves. 13. VCEG Meeting; Feb. 4, 2001-Apr. 4, 2001 ; Austin, Texas, US; (Videocoding Experts Group of ITU-T SG.16),, No. VCEG-M33, Mar. 28, 2001 (Mar. 28, 2001), XP030003212, ISSN: 0000-0461 the whole document.

Sun, et al., "Comparing Subjective Perceived Quality with Objective Video Quality by Content Characteristics and Bit Rates", IEEE International Conference on New Trends in Information and Service Science, Jun. 30-Jul. 2, 2009, Beijing, China.

Anonymous: "MeGUI/x264 Settings/x264 Stats Output", Feb. 19, 2015, URL:https://en.wikibooks.org/w/index.php?title=MeGUI/ x264_Settings/x264_Stats_Output&oldid=2767805, 3 pages.

* cited by examiner

| Bitrate at PSNR of 41 | Classification |
|---|---|
| R < 1750 | Bucket 1 Low Complexity |
| 1750 <= R < 4300 | Bucket 2 Medium Complexity |
| 4300 <= R | Bucket 3 High Complexity |

Complexity Bucket $132_1$
Complexity Bucket $132_2$
Complexity Bucket $132_3$

| | Bucket 1 Low Complexity | | Bucket 2 Medium Complexity | | Bucket 3 High Complexity | |
|---|---|---|---|---|---|---|
| Bitrate | Resolution | Profile | Resolution | Profile | Resolution | Profile |
| 375 | 480 | Base | | | 288 | Base |
| 560 | 480 | Base | 288 | Base | 384 | Base |
| 750 | 480 | Base | 384 | Base | 384 | Base |
| 1050 | 720 | Main | 384 | Base | 480 | Base |
| 1750 | 1080 | High | 480 | Base | 480 | Base |
| 2350 | 1080 | High | 480 | Base | 720 | Main |
| 3000 | 1080 | High | 720 | Main | 720 | Main |
| 4300 | | | 720 | Main | 720 | Main |
| 5800 | | | 1080 | High | 1080 | High |
| 7500 | | | 1080 | High | 1080 | High |

Bitrate Ladder $134_1$
Bitrate Ladder $134_2$
Bitrate Ladder $134_3$

TECHNIQUES FOR OPTIMIZING BITRATES AND RESOLUTIONS DURING ENCODING

BACKGROUND OF THE INVENTION

Field of the Invention

Embodiments of the present invention relate generally to computer science and, more specifically, to techniques for optimizing bitrates and resolutions during encoding.

Description of the Related Art

Efficiently and accurately encoding source data is essential for real-time delivery of video content. In operation, after the encoded data is received at an endpoint machine, the encoded data is decoded and viewed or otherwise further processed. To increase compression rates and/or reduce the size of the encoded data, many encoding processes leverage lossy data compression techniques that eliminate selected information, typically enabling only approximate reconstruction of the source data. Notably, as the encoder eliminates information, the resolution of the encoded data decreases and, consequently, the likelihood that the approximate reconstruction has the visual quality viewers expect and desire also decreases.

In operation, encoders are often configured to implement a fixed bitrate ladder that makes tradeoffs between resources consumed during the encoding/decoding process (e.g., processing time, bandwidth, storage, etc.) and visual quality. Each "rung" in the bitrate ladder represents a different bitrate and resolution. In general, given an available bitrate, the encoder selects the encoding bitrate and resolution based on the bitrate ladder, and then generates encoding data at the determined bitrate and resolution.

In practice, a bitrate ladder is tuned to generate encoded data having the requisite level of quality for "typical" source data. However, in situations where source data differs noticeably from "typical" source data, the tradeoffs represented by the bitrate ladder may not be appropriate. For example, if the bitrate ladder is designed to optimize tradeoffs for simple cartoons, and the source data is a detailed action movie, then the tradeoffs that the bitrate ladder imposes during encoding may result in unacceptably poor visual quality. Conversely, if the bitrate ladder is designed to optimize tradeoffs for detailed action movies, and the source data is a simple cartoon, then the tradeoffs that the bitrate ladder imposes during encoding may dramatically increase resource burdens, such as storage and bandwidth usage, without noticeably increasing visual quality.

As the foregoing illustrates, what is needed in the art are more effective techniques for selecting bitrates and resolutions when encoding source data.

SUMMARY OF THE INVENTION

One embodiment of the present invention sets forth a computer-implemented method for selecting a bitrate ladder for encoding source data. The method includes selecting a set of parameter values for a quantization parameter; for each parameter value, configuring an encoder to encode source data to generate a set of encoded data while maintaining the quantization parameter at the parameter value; for each set of encoded data, determining a value of a video quality metric and a corresponding bitrate; deriving a relationship between the video quality metrics and the corresponding bitrates; determining a bucketing bitrate at which the video quality metric is equal to a predetermined threshold based on the relationship; and selecting a bitrate ladder for encoding the source data based on the bucketing bitrate.

One advantage of the disclosed bitrate ladder selection techniques is that these techniques enable the selection of complexity-tuned bitrates and resolutions when encoding source data. Notably, because the disclosed techniques tailor the bitrate ladder to reflect the complexity of the source data, tradeoffs between encoding quality and encoding resources are optimized compared to conventional techniques that implement a constant bitrate ladder irrespective of the complexity of the source data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
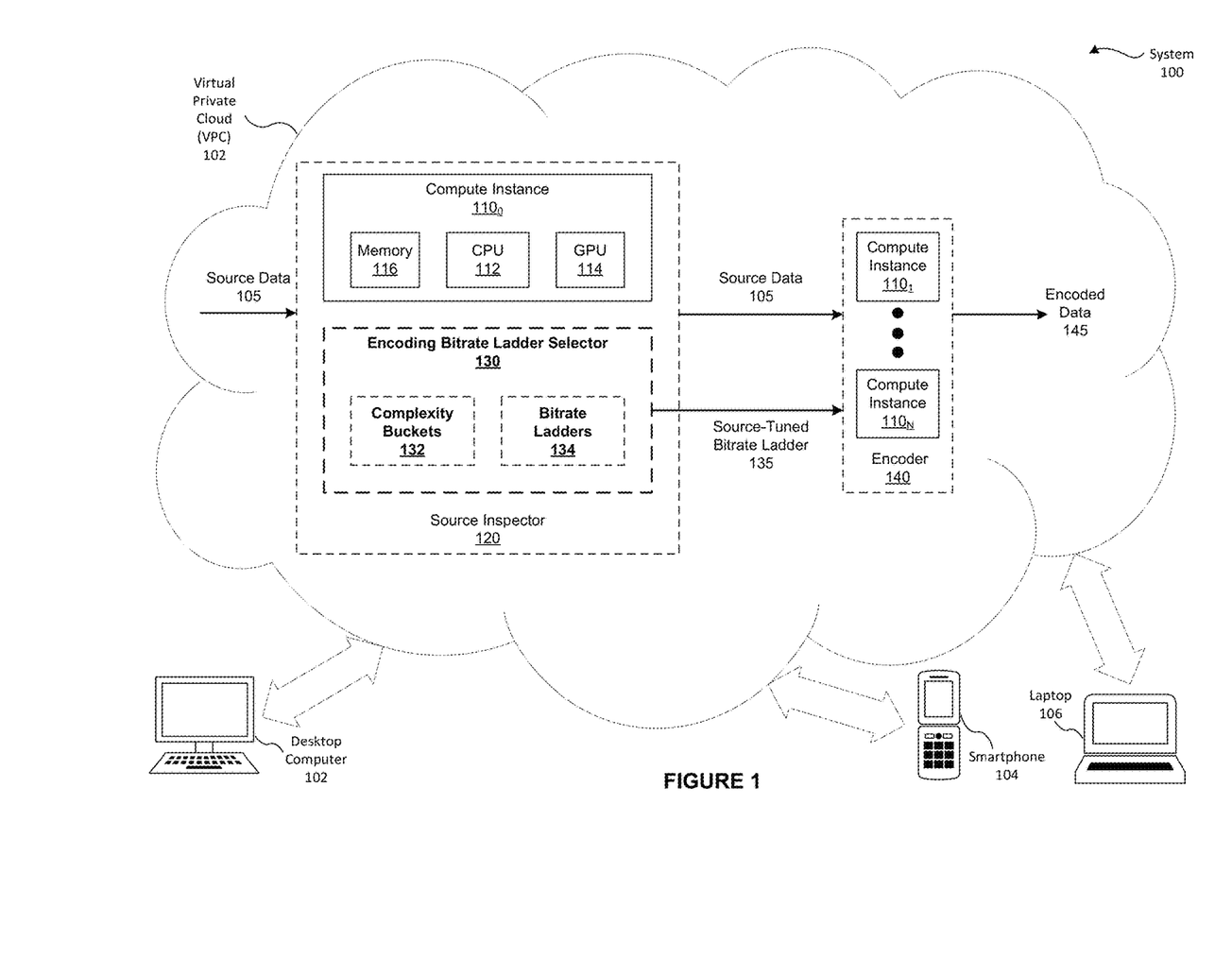
FIG. 1 is a conceptual illustration of a system configured to implement one or more aspects of the present invention.

FIG. 1 is a conceptual illustration of a system 100 configured to implement one or more aspects of the present invention. As shown, the system 100 includes a virtual private cloud (i.e., encapsulated shared resources, software, data, etc.) 102 connected to a variety of devices capable of transmitting input data and/or displaying video. Such devices include, without limitation, a desktop computer 102, a smartphone 104, and a laptop 106. In alternate embodiments, the system 100 may include any number and/or type of input, output, and/or input/output devices in any combination.

The virtual private cloud (VPC) 102 includes, without limitation, any number and type of compute instances 110.

The VPC 102 receives input user information from an input device (e.g., the laptop 106), one or more computer instances 110 operate on the user information, and the VPC 102 transmits processed information to the user. The VPC 102 conveys output information to the user via display capabilities of any number of devices, such as a conventional cathode ray tube, liquid crystal display, light-emitting diode, or the like.

In alternate embodiments, the VPC 102 may be replaced with any type of cloud computing environment, such as a public or a hybird cloud. In other embodiments, the system 100 may include any distributed computer system instead of the VPC 102. In yet other embodiments, the system 100 does not include the VPC 102 and, instead, the system 100 includes a single processing or multi-processing unit.

As shown for the compute instance $110_0$, each compute instance 110 includes a central processing unit (CPU) 112, a graphics processing unit (GPU) 114, and a memory 116. In operation, the CPU 112 is the master processor of the compute instance 110, controlling and coordinating operations of other components included in the compute instance 110. In particular, the CPU 112 issues commands that control the operation of the GPU 114. The GPU 114 incorporates circuitry optimized for graphics and video processing, including, for example, video output circuitry. In various embodiments, GPU 114 may be integrated with one or more of other elements of the compute instance 110. The memory 116 stores content, such as software applications and data, for use by the CPU 112 and the GPU 114 of the compute instance 110.

In general, the compute instances 110 included in the VPC 102 are configured to implement one or more applications. More specifically, the compute instances 110 included in the VPC 102 are configured to encode source data 105, such as a video file. As shown, compute instance $110_0$ is configured as a source inspector 110, and compute instances $110_1$-$110_N$ are configured as an encoder 140. In alternate embodiments, source inspector 110 may include more compute instances 110, and encoder 140 may include only a single compute instance 110.

The source inspector 110 receives the source data 105 and performs any number of pre-encoding operations, including configuring the encoder 140. For example, in some embodiments, the encoder 140 is a parallel chunk encoder. In such embodiments the source inspector 110 breaks the source into multiple source chunks prior to routing the source chunks to compute instances 140 included in the parallel chunk encoder. In general, the encoder 140 includes multiple modes and settings that enable customization of the encoding operations (e.g., compression algorithms). In particular, the encoder 140 implements, without limitation, both a constant bitrate mode and a constant quality encoding mode. In the constant bitrate mode, the encoder 140 attempts to maintain a target bitrate throughout the encoding process. If the encoder 140 detects that the encoded bitrate is greater than the target bitrate, then the encoder 140 reduces the quality of encoded data 145. If the encoder 140 detects that the encoded bitrate is less than the target bitrate, then the encoder 140 increases the quality of the encoded data 145. By contrast, in the constant quality encoding mode, the encoder 140 attempts to maintain a constant quality throughout the encoding process. The encoder 140 measures the quality of the encoded data 145 and varies a quantization parameter (QP) that defines the amount of signal detail to include in the encoded data 145 to maintain the encoded quality at the target quality. Alternatively, the encoder 140 sets the QP to a constant value throughout the encoding process.

As persons skilled in the art will recognize, the configuration of the encoder 140 dramatically impacts the required resources, such as bandwidth and storage, and the quality of the encoded data 145. Configuring the encoder 140 to optimize the encoded data 145 to satisfy an acceptable perceived visual quality without wasting required resource across different types of the source data 105 is difficult. Conventional approaches, such as those leveraging a constant bitrate ladder and encoding at a target bitrate, optimize the quality/resource tradeoff for some types of source data 105, but produce poor results for other types of source data 105.

For this reason, the source inspector 110 includes an encoding bitrate ladder selector 130. In operation, the encoding bitrate ladder selector 130 leverages the encoder 140 to estimate the complexity of the source data 105 and then assigns the source data 105 to a complexity bucket 132. Subsequently, the encoding bitrate ladder selector 130 identifies a bitrate ladder 134 that is associated with the selected complexity bucket 132 as a source-tune bitrate ladder 135. In this fashion, the encoding bitrate ladder selector 130 enables the quality/resource tradeoff to be optimized to reflect the complexity of the source data 105.

In general, the encoding bitrate ladder selector 130 may include any number of complexity buckets 132, where each of the complexity buckets 132 represents a different range of complexities for the source data 105 For example, in some embodiments, the "simple" complexity bucket 132 represents the lowest range of complexities, such as source data 105 for a basic cartoon. Each of the complexity buckets 132 is associated a particular one of the bitrate ladders 134 that is tailored to optimize the encoding tradeoffs for source data 105 of the complexities represented by the complexity bucket 132.

The encoding bitrate ladder selector 130 may implement the complexity buckets 132 and the bitrate ladders 134 in any technically feasible fashion. In some embodiments, the encoding bitrate ladder selector 130 includes an initialization unit that establishes the complexity buckets 132 and the bitrate ladders 134 prior to processing any source data, including the source data 105. In other embodiments, the initialization unit is not included in the encoding bitrate ladder selector 130, but is a unit included in the system 100. In yet other embodiments, the initialization unit is not included in system 100.

In one embodiment, the initialization unit provides encoding quality feedback information that is manually evaluated to generate the optimized complexity buckets 132 and the bitrate ladders 134 First, the initialization unit receives a "typical" bitrate ladder. The initialization unit then analyzes a variety of test data (spanning the expected complexity range of the source data 105) across the bitrates included in the typical bitrate ladder. The resulting encoded test data spans both the rungs of the ladder and the test data.

After generating the encoded test data, the initialization unit evaluates quality of each of the encoded test data. More specifically, the initialization unit applies the Tektronix® Picture Quality Analyzer (PQA) tool to the encoded test data. The PQA tool assigns a Picture Quality Rating (PQR) score to the encoded test data that "closely correspond with subjective human visual assessment." The initialization unit then graphs bitrate versus the PQR score quality, where quality is the PQR score. Based on the PQR graphs, the optimized complexity buckets 132 and the bitrate ladders 134 are selected to produce acceptable tradeoffs between resource and quality across the expected complexity of the source data 105. Among other things, the optimized complexity buckets 132 and the bitrate ladders 134 may be created to satisfy the following objectives:

Improve the video quality given the same bitrate by optimizing the resolution.

Save on storage and bandwidth. For simple sources, the high bitrate streams may be unnecessary (no obvious quality gain) and, consequently, waste storage and bandwidth.

Achieve better quality for complex sources, at the expense of a higher bitrate stream. For complexity buckets 132 corresponding to complicate test data, additional bitrates may be added to achieve acceptable quality.

The complexity buckets 132 and the bitrate ladders 134 may be generated based on the PQR graphs in any technically feasible fashion—such as manual evaluation. In alternate embodiments, the PQR score may be replaced with any quality measurement. In general, the complexity buckets 132 and the bitrate ladders 134 may be generated in any technically feasible fashion that evaluates test data across a variety of complexities and bitrates.

After the initialization unit finishes, the resulting complexity buckets 132 and the bitrate ladders 134 are incorporated into or communicated to the encoding bitrate ladder selector 130. In various embodiments, the complexity buckets 132 and the bitrate ladders 134 may be transferred into the system 100 via any communication method as known in the art.

Estimating Source Complexity

Figure 2:
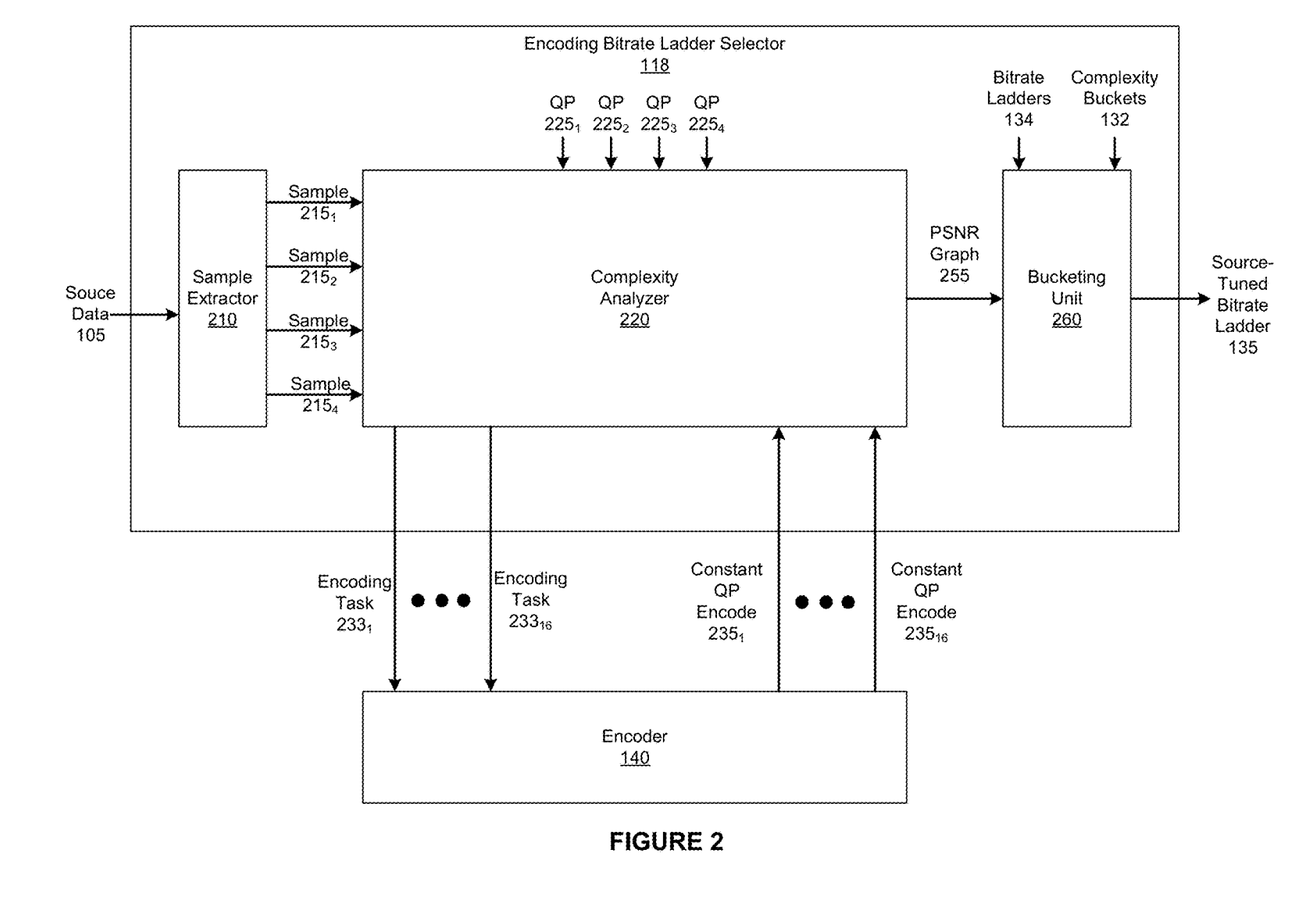
FIG. 2 is a block diagram illustrating the encoding bitrate ladder selector of FIG. 1, according to one embodiment of the present invention.

FIG. 2 is a block diagram illustrating the encoding bitrate ladder selector 130 of FIG. 1, according to one embodiment of the present invention. The encoding bitrate ladder selector 130 receives the source data 105, estimates the complexity of the source data 105, and selects a corresponding source-tuned bitrate ladder 135 from the bitrate ladders 134. As part of identifying the bitrate ladder 134 that represents the optimal resource/quality tradeoff for the source data 105, the encoding bitrate ladder selector 130 leverages the encoder 140 and the complexity buckets 132.

As shown, the encoding bitrate ladder selector 130 includes, without limitation, a sample extractor 210, a complexity analyzer 220, and a bucketing unit 260. Upon receiving the source data 105, the sample extractor 210 partitions the source data 105 into four equal-length segments. For each segment, the sample extractor 210 selects a one minute sample 215 that is centered at the midpoint of the segment. In this fashion, the sample encoder identifies four, one minute samples 215 that are evenly distributed throughout the source data 105. Together, the samples 215 serve as a proxy for the source data 105. Because the samples 215 include less information than the source data 105, the time required to evaluate the complexity of the samples 215 is less than the time required to evaluate the complexity of the source data 105.

In alternate embodiments, the sample extractor 210 may partition the source data 105 into any number of segments and extract samples from the segments in any manner that generates a representative proxy for the source data 105. Further, the sample extractor 210 may be configured to generate any number and length of the samples 215 in any manner (e.g., meeting a constraint for maximum processing time). In yet other embodiments, the sample extractor 210 is omitted and the source data 105 is processed as a single, full-length sample 215.

The complexity analyzer 220 receives the four samples 215 and configures the encoder 140 to perform fixed QP encodes of the four samples 215 at a resolution of 1080p across four different QPs 225. In operation, the complexity analyzer 220 configures the encoder 140 to execute sixteen encoding tasks 233, thereby generating sixteen constant QP encodes 235. The values of the QPs 225 are experimentally and/or heuristically determined and vetted to provide good coverage across a range of QPs 225 that are anticipated to effectively reduce resource usage without unacceptable degrading quality for any number of complexities. In alternate embodiments, the complexity analyzer 220 may customize the encoder 140 to perform any number of the encoding tasks 233 across any number of QPs 225 and any number of samples 215, in any combination. Further, the complexity analyzer 220 may perform fixed QP encodes for any number and values of resolutions.

To increase the accuracy of the complexity analysis process for the system 100, the complexity analyzer 220 leverages the encoder 140 that is included as part of the encoding process for the source data 105. However, in alternate embodiments, the complexity analyzer 220 may configure any available number and type of encoder to generate the constant QP encodes 235.

For each of the constant QP encodes 235, the complexity analyzer 220 then determines the peak signal-to-noise ratio (PSNR)—an objective quality metric based on mean-squared-error—value and calculates the bitrate. In some embodiments, the complexity analyzer 220 configures the encoder 140 to measure the PSNR values of the constant QP encodes 235. In alternate embodiments the complexity analyzer 220 uses a PSNR measurement tool that may or may not be part of the complexity analyzer 220 to measure the PSNR value of each of the constant QP encodes 235.

The complexity analyzer 220 determines the bitrate of each of the constant QP encodes 235 in any technically feasible fashion. In some embodiments, the complexity analyzer 220 performs read operations on log files (generated by the encoder 140 during the encoding process) to identify the bitrate. In other embodiments, the complexity analyzer 220 calculates the bitrate by dividing the size of the constant QP encode 235 (i.e., the file size) by the duration of the constant QP encode 235 (i.e., number of frames divided by the frames per second).

After obtaining the PSNR values and the corresponding bitrates, the complexity analyzer 220 correlates the PSNR values and the corresponding bitrates. In some embodiments, prior to performing correlation operations, the complexity analyzer 220 averages the PSNR values and/or the corresponding bitrates for each of the QPs 255. More specifically, for QP $255_0$, the complexity analyzer 220 averages across the four PSNR values and across the four bitrates obtained for the four samples 115 during the encoding of the constant QP encodes 235 at the QP $255_0$.

As shown, the complexity analyzer 220 generates a PSNR graph 255 that reflects the determined correlation. In operation, the complexity analyzer 220 plots the PSNR values versus the bitrates for the constant QP encodes 235 and then performs curve fitting operations to generate a curve equation. In alternate embodiments, instead of the PSNR graph 255, the complexity analyzer 220 generates an equation that includes a PSNR variable and a bitrate variable based on statistics associated with the constant QP encodes 235. In general, embodiments of the present invention may employ any technically feasible technique and/or any quality measurement instead of PSNR to determine an estimated relationship between the quality and bitrates of the constant QP encodes 255.

Assigning Source-Tuned Bitrate Ladder

The bucketing unit 260 evaluates the PSNR graph 255 in conjunction with the complexity buckets 132 and the bitrate ladders 134 to generate the source-tuned bitrate ladder 135. More specifically, the bucketing unit 260 determines a complexity bucketing bitrate based on the PSNR graph 255. The complexity bucketing bitrate is the bitrate at which the PSNR value of the PSNR graph 255 equals a predetermined low distortion threshold. Consequently, the complexity bucketing bitrate is the estimated bitrate at which the distortion of the encoded data 145 relative to the source data 105 matches the predetermined low distortion threshold. The predetermined low distortion threshold may be assigned using any of a variety of heuristics and experimental techniques that are consistent with the complexity buckets 132 and the bitrate ladders 134.

In general, the bucketing unit 260 may determine the complexity bucketing bitrate in any technically feasible fashion. For example, the bucketing unit 260 may identify the intersection between the curve of the PSNR graph 255 and the line corresponding to a constant PSNR value of the predetermined low distortion threshold. In alternate embodiments the bucketing unit 260 may set the PSNR variable of a PSNR/bitrate equation to the predetermined low distortion threshold and then solve the PSNR/bitrate equation for the value of the bitrate variable.

Subsequently, the bucketing unit 260 compares the complexity bucketing bitrate to the bitrate ranges of the complexity buckets 132 and selects the encompassing complexity bucket 132. The bucketing unit 260 then sets the source-tuned bitrate ladder 135 to the bitrate ladder 134 that corresponds to the selected complexity bucket 132. In this fashion, the source-tuned bitrate ladder 135 varies based on the estimated complexity of the source 105. Advantageously, unlike conventional techniques that rely on a single bitrate ladder, this categorization process optimizes resource/quality tradeoffs across different complexities of the source 105.

Figure 3:
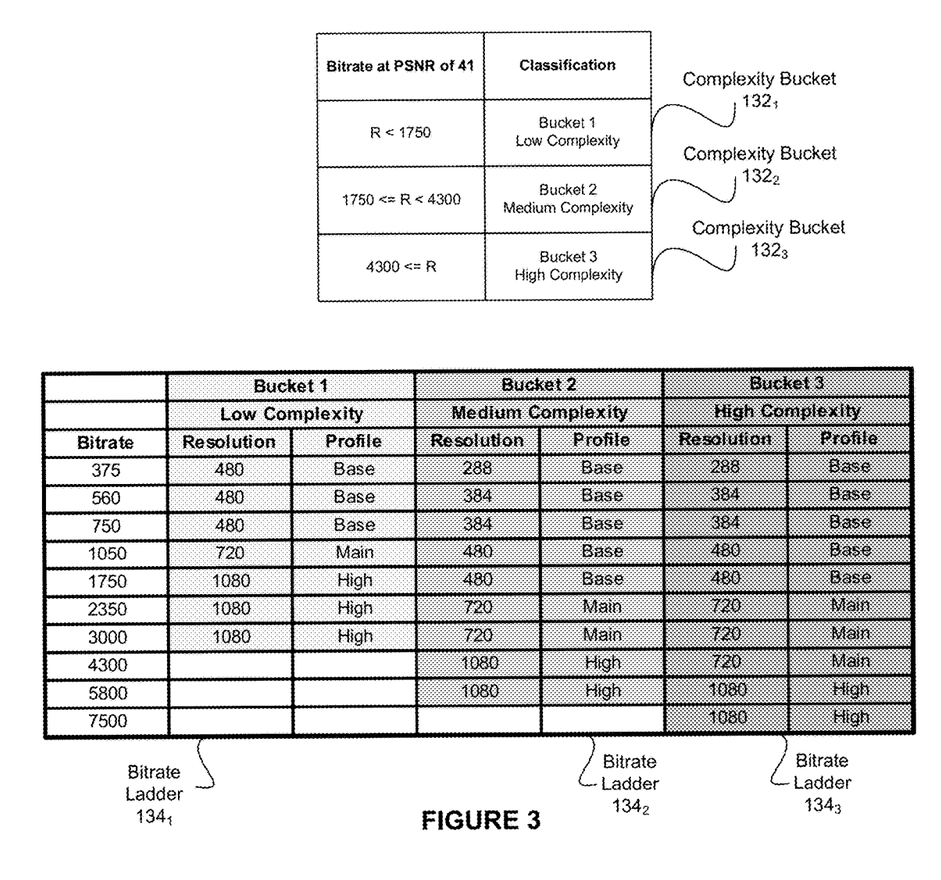
FIG. 3 is a conceptual illustration of the complexity buckets and the bitrate ladders implemented by the encoding bitrate ladder selector of FIG. 2, according to one embodiment of the present invention.

FIG. 3 is a conceptual illustration of the complexity buckets 132 and the bitrate ladders 134 implemented by the encoding bitrate ladder selector 130 of FIG. 2, according to one embodiment of the present invention. As shown, the complexity buckets 132 include three different classifications based on the bitrate at a low correlation threshold of PSNR value equal to 41 decibels (dB). As persons skilled in the art will recognize, if the PSNR value is greater than 40 dB, then the encoded data 145 is generally considered very low distortion compared to the source data 105. Alternate embodiments may include any number of classifications and any low correlation threshold.

Based on the PSNR graph 255, the bucketing unit 260 determines the complexity bucketing bitrate (R)—the bitrate value of the curve corresponding to a PSNR value of 41 dB. As shown, the complexity buckets 132 include the low complexity bucket $132_1$, the medium complexity bucket $132_2$, and the high complexity bucket $132_3$. If the complexity bucketing bitrate is less than 1750 kilobits per second (kbps) then the bucketing unit 260 assigns the source data 135 to the low complexity bucket $132_1$. If the complexity bucketing bitrate lies between 1750 kbps and 4300 kbps, then the bucketing unit 260 assigns the source data 135 to the medium complexity bucket $132_2$. If the complexity bucketing bitrate is at least 4300 kbps, then the bucketing unit 260 assigns the source data 135 to the high complexity bucket $132_3$.

As also shown, each of the complexity buckets 132 is associated with a different one of the bitrate ladders 134. The bitrate/resolution pairs define the rungs of each of the bitrate ladders 134. In addition, each rung includes a profile that specifies the complexity of the algorithm that the encoder 140 employs during the encoding process. The values of each rung and the number of rungs are tailored for each of the complexity buckets 132. Together, the complexity buckets 132 and the bitrate ladders 134 are designed to optimize tradeoffs between resources and quality improvements. For example, for low complexity sources, maximum perceptible visual quality is achieved at a bitrate of around 3000 kbps. Because encoding at higher bitrates wastes resources without noticeably increasing visual quality, the highest rung of the low complexity bitrate ladder $134_1$ is at 3000 kbps and, consequently, the encoder 140 generates the encoded data 145 with a maximum bitrate of 3000 kbps.

Figure 4:
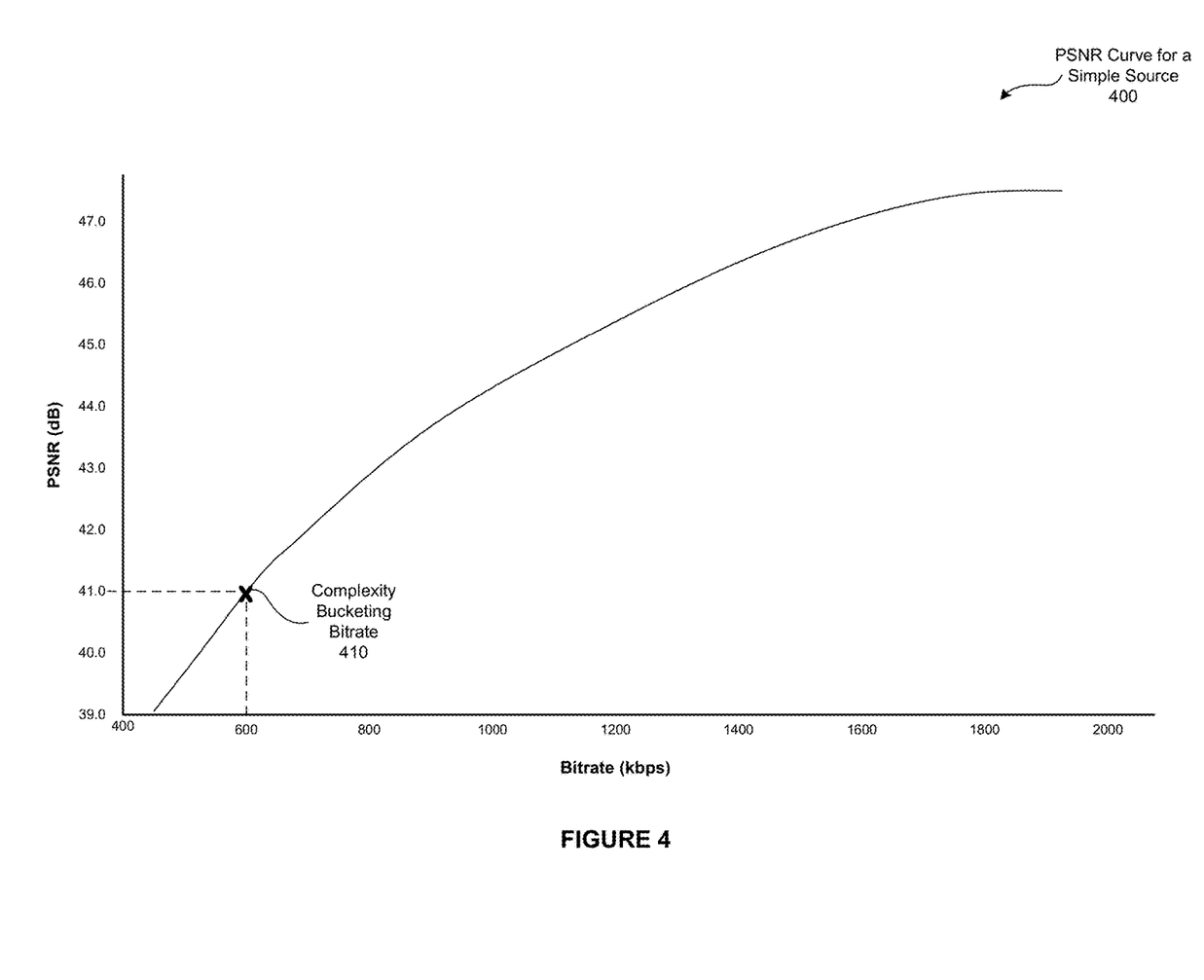
FIG. 4 is a conceptual illustration of a peak signal-to-noise ratio (PSNR) curve for a simple source constructed by the complexity analyzer of FIG. 2, according to one embodiment of the present invention.

FIG. 4 is a conceptual illustration of a peak signal-to-noise ratio (PSNR) curve for a simple source 400 constructed by the complexity analyzer 220 of FIG. 2, according to one embodiment of the present invention. As shown, the complexity bucketing bitrate 410 (i.e., the bitrate of the curve at the low correlation threshold of PSNR value equal to 41 dB) is 600 kbps. More specifically, the horizontal dotted line depicts the constant line with PSNR value equal to 41 dB. The horizontal dotted line intersects the PSNR curve for a simple source 400 at the complexity bucketing bitrate 410, shown as an "x." Tracing vertically downwards from the complexity bucketing bitrate 410 (following the vertical dotted line), shows that the complexity bucketing bitrate 410 intersects the bitrate axis at 600 kbps.

Referring back to FIG. 3, based on the bitrate of 600 kbps, the bucketing unit 260 assigns the source data 105 to the low complexity bucket $132_1$ and sets the source-tuned bitrate ladder 135 to the corresponding low complexity bitrate ladder $134_1$ Notably, implementing the bitrate ladder $134_1$ ensures that the highest encoding resolution and bitrate are, respectively, 1080p and 3000 kbps (the highest rung of the low complexity bitrate ladder $134_1$). Advantageously, since higher encoding resolutions and bitrates, such as the 1080p resolution and 4300 kbps bitrate rung of the medium complexity bitrate ladder $134_1$, provide no additional quality gain for simple source data 105, limiting the encoding resolution and bitrate conserves resources without impacting quality.

Figure 5:
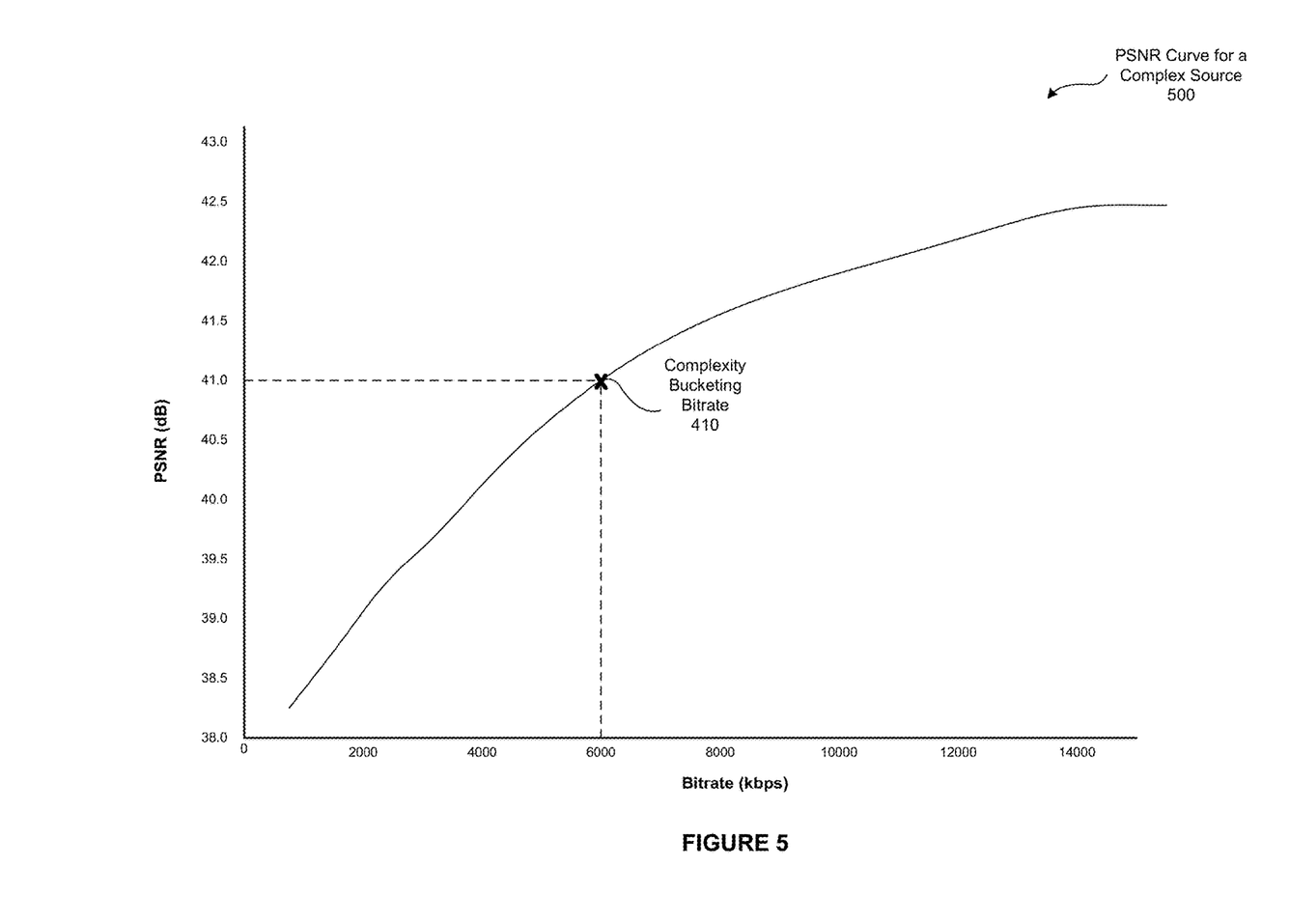
FIG. 5 is a conceptual illustration of a peak signal-to-noise ratio (PSNR) curve for a complex source constructed by the complexity analyzer of FIG. 2, according to one embodiment of the present invention.

FIG. 5 is a conceptual illustration of a peak signal-to-noise ratio (PSNR) curve for a complex source constructed by the complexity analyzer of FIG. 2, according to one embodiment of the present invention. As shown, the complexity bucketing bitrate 410 (i.e., the bitrate of the curve at the low correlation threshold of PSNR value equal to 41 dB) is 6000 kbps. More specifically, the horizontal dotted line depicts the constant line with PSNR value equal to 41 dB. The horizontal dotted line intersects the PSNR curve for a complex source 500 at the complexity bucketing bitrate 410, shown as an "x." Tracing vertically downwards from the complexity bucketing bitrate 410 (following the vertical dotted line), shows that the complexity bucketing bitrate 410 intersects the bitrate axis at 6000 kbps.

Referring back to FIG. 3, based on the bitrate of 6000 kbps, the bucketing unit 260 assigns the source data 105 to the high complexity bucket $132_3$ and sets the source-tuned bitrate ladder 135 to the corresponding high complexity bitrate ladder $134_3$. Notably, implementing the bitrate ladder 134₃ configures the encoder 140 to encode the source data 105 at a maximum resolution of 1080p and a maximum bitrate of 7500 mbps. Because the source data 105 is relatively complex, such a tradeoff enables noticeable quality improvement using available resources. By contrast, if the source-tuned bitrate ladder 135 were to be the medium complexity bitrate ladder 134₂, then the encoding bitrate would be unnecessarily limited to 5800 mbps.

Figure 6:
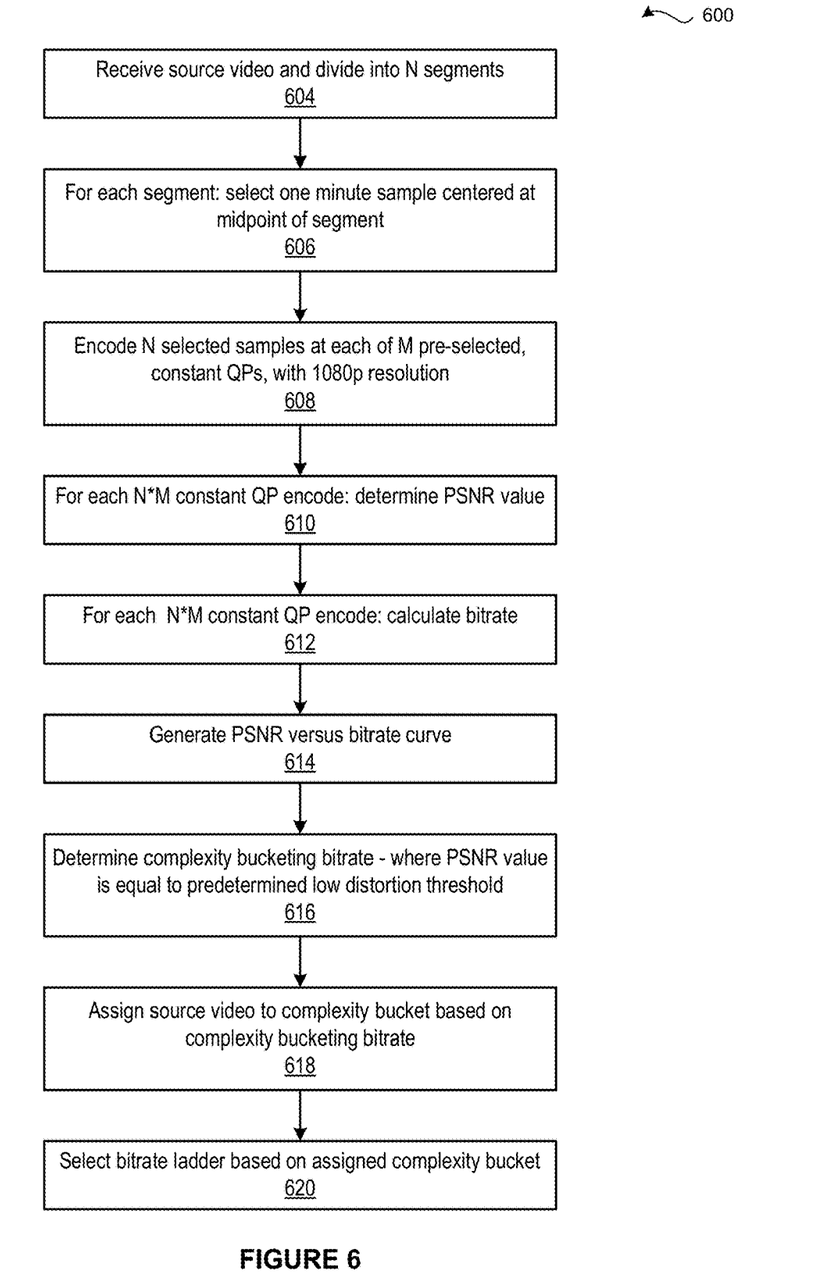
FIG. 6 is a flow diagram of method steps for selecting and implementing a bitrate ladder while encoding video source data, according to one embodiment of the present invention.

FIG. 6 is a flow diagram of method steps for selecting and implementing a bitrate ladder while encoding video source data, according to one embodiment of the present invention. Although the method steps are described with reference to the systems of FIGS. 1-5, persons skilled in the art will understand that any system configured to implement the method steps, in any order, falls within the scope of the present invention. For discussion purposes only, it is assumed in this description of FIG. 6 that a low distortion threshold, QPs 225, the bitrate ladders 134, and the complexity buckets 132 are predetermined in any technically feasible fashion.

As shown, a method 600 begins at step 604, where the encoding bitrate ladder selector 130 receives the source data 105, and the sample extractor 210 partitions the source data 105 into N segments, where N is any positive integer. At step 606, for each of the N segments, the sample extractor 210 selects a fixed-length sample 215 centered at the midpoint of the segment. Advantageously, the resulting N samples 215 serve as a proxy for the source data 105, reducing analysis time by limiting the total amount of data that is evaluated to classify the complexity of the source data 105.

The complexity analyzer 220 receives the samples 215 and then configures the encoder 140 to perform fixed QP encodes of the samples 215 at a fixed resolution across M predetermined, constant QPs 225. At step 608, the complexity analyzer 220 determines a PSNR value for each of the (N*M) constant QP encodes 235. In some embodiments, the complexity analyzer 220 configures the encoder 140 to measure the PSNR values of the constant QP encodes 235. In general, embodiments of the present invention may replace PSNR with any quality metric, and the subsequently measurements and calculations are modified accordingly.

At step 610, the complexity analyzer 220 determines a corresponding bitrate value for each of the constant QP encodes 235. The complexity analyzer 220 determines the bitrate of each of the constant QP encodes 235 in any technically feasible fashion. In some embodiments, the complexity analyzer 220 calculates the bitrate by dividing the size of the constant QP encode 235 (i.e., the file size) by the duration of the constant QP encode 235 (i.e., number of frames divided by the frames per second).

At step 614, the complexity analyzer 220 generates the PSNR graph 255 that includes a best-fit curve relating the PSNR values and the corresponding bitrates. In alternate embodiments, instead of the PSNR graph 255, the complexity analyzer 220 generates an equation that includes a PSNR variable and a bitrate variable based on statistics associated with the constant QP encodes 235. In general, embodiments of the present invention may employ any technically feasible technique to determine an estimated relationship between the quality and bitrates of the constant QP encodes 255.

At step 616, the bucketing unit 260 evaluates the PSNR graph 255 and determines the complexity bucketing bitrate 410. Notably, the bucketing unit 260 sets the complexity bucketing bitrate 410 to the value of the bitrate in the PSNR graph 255 where the PSNR value is equal to a predetermined low distortion threshold. Subsequently, the bucketing unit 260 selects the complexity bucket 132 that corresponds to a range of bitrates that includes the complexity bucketing bitrate 410. At step 618, the bucketing unit 260 selects the bitrate ladder 134 that corresponds to the selected complexity bucket 132. At step 620, the bucketing unit 260 sets the source-tuned bitrate ladder 135 to the selected bitrate ladder 134, and the method 600 terminates.

Notably, the source-tuned bitrate ladder 135 is tuned to optimize the encoding bitrates and resolution for source data of comparable complexity to the source data 105. For example, referring back to FIG. 3, for source data 105 that is relatively simple, the source-tuned bitrate ladder 135 does not include bitrate rungs higher than 3000 kbps that provide no noticeably quality improvement. By contrast, for source data 105 that is relatively complex, the source-tuned bitrate ladder 135 includes a bitrate rung of 7500 kbps that provides increased quality at the expense of resources, such as memory and bandwidth.

In sum, the disclosed techniques may be used to efficiently select an optimized bitrate ladder (i.e., pairs of bitrates and resolutions) for encoding source data. In operation, a source inspector extracts "N" distributed sample segments from the source data. For each of the sample segments, a complexity analyzer configures an encoder to perform fixed quantization parameter encodes across "M" different values for the quantization parameter. The complexity analyzer then generates an equation for a peak signal-to-noise ratio (PSNR) curve that reflects the relationship between the PSNR and the bitrate for the (N*M) encoded data segments.

Subsequently, a bucketing unit sets the PSNR variable of this equation to a predetermined value that represents an acceptable level of distortion, and solves the equation to obtain a bucketing bitrate. Based on the bucketing bitrate the bucketing unit assigns the source data to one of multiple complexity buckets, where each complexity bucket spans a bitrate range that achieves the acceptable level of distortion for source data of a particular complexity. For instance, one bucket may represent simple source data such as cartoons, while another bucket may represent complex source data such as detailed action movies. Notably, each complexity bucket is associated with a bitrate ladder that is empirically determined to optimize encoding source data of the corresponding complexity.

Advantageously, sagaciously creating complexity buckets and encoding each source data using the bitrate ladder of the appropriate complexity bucket optimizes encoding for source data of different complexities. More specifically, because the disclosed techniques tune the bitrate ladder to the complexity of the source, bucketing enables prudent tradeoffs between encoding quality and encoding resources, such as bandwidth and storage. By contrast, conventional encoding processes that rely on a single bitrate ladder often result in encoding that is of an unacceptable low quality or does not effectively exploit opportunities to increase or decrease the use of encoding resources based on judiciously estimated perceptible quality differences.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for selecting a bitrate ladder for encoding source data, the method comprising:
   selecting a set of parameter values for a quantization parameter;
   for each parameter value, performing an encoding process that configures an encoder to encode source data to generate a set of encoded data while maintaining the quantization parameter at the parameter value;
   for each set of encoded data, determining a value of a video quality metric and a corresponding bitrate;
   deriving a relationship between the video quality metrics and the corresponding bitrates;
   determining, based on the relationship, a bucketing bitrate corresponding to a first video quality metric, wherein the first video quality metric is equal to a predetermined threshold;
   determining that the bucketing bitrate falls within a bitrate range associated with a first bitrate ladder included in a plurality of bitrate ladders, wherein each bitrate ladder included in the plurality of bitrate ladders is associated with a different bitrate range and includes a different plurality of bitrate-resolution pairs;
   selecting the first bitrate ladder for encoding the source data based on the bucketing bitrate falling within the bitrate range.

2. The computer-implemented method of claim 1, wherein configuring the encoder to encode source data while maintaining the quantization parameter at a given parameter value comprises setting an amount of signal detail to include in the encoded data.

3. The computer-implemented method of claim 1, wherein selecting the set of parameter values comprises selecting an amount of signal detail that satisfies both an accuracy constraint and a complexity constraint.

4. The computer-implemented method of claim 1, wherein determining the value of a video quality metric comprises identifying a peak signal-to-noise rate.

5. The computer-implemented method of claim 1, wherein determining the value of a video quality metric comprises calculating a picture quality rating.

6. The computer-implemented method of claim 1, wherein determining a corresponding bitrate for a set of encoded data comprises performing a division operation based on a size associated with the set of encoded data and an amount of time associated with the play-out duration of the set of encoded data.

7. The computer-implemented method of claim 1, wherein the relationship is a curve, and deriving the relationship comprises applying one or more curve fitting operations to the set of encoded data.

8. The computer-implemented method of claim 1, further comprising, prior to configuring the encoder, extracting a plurality of samples from the source data, wherein the encoder generates the sets of encoded data based on signal detail associated with the plurality of samples.

9. A non-transitory computer-readable storage medium including instructions that, when executed by a processing unit, cause the processing unit to select a bitrate ladder for encoding source data by performing the steps of:

selecting a set of parameter values for a quantization parameter;

for each parameter value, performing an encoding process that configures an encoder to encode source data to generate a set of encoded data while maintaining the quantization parameter at the parameter value;

for each set of encoded data, determining a value of a video quality metric and a corresponding bitrate;

deriving a relationship between the video quality metrics and the corresponding bitrates;

determining, based on the relationship, a bucketing bitrate corresponding to a first video quality metric, wherein the first video quality metric is equal to a predetermined threshold;

determining that the bucketing bitrate falls within a bitrate range associated with a first bitrate ladder included in a plurality of bitrate ladders, wherein each bitrate ladder included in the plurality of bitrate ladders is associated with a different bitrate range and includes a different plurality of bitrate-resolution pairs;

selecting the first bitrate ladder for encoding the source data based on the bucketing bitrate falling within the bitrate range.

10. The non-transitory computer-readable storage medium of claim 9, wherein configuring the encoder to encode source data while maintaining the quantization parameter at a given parameter value comprises setting an amount of signal detail to include in the encoded data.

11. The non-transitory computer-readable storage medium of claim 9, further comprising, prior to configuring the encoder, setting the predetermined threshold to correspond to a maximum acceptable amount of distortion.

12. The non-transitory computer-readable storage medium of claim 9, wherein determining the value of a video quality metric comprises identifying a peak signal-to-noise rate.

13. The non-transitory computer-readable storage medium of claim 9, wherein determining the value of a video quality metric comprises performing one or more read operations on the log file generated by the encoder.

14. The non-transitory computer-readable storage medium of claim 9, wherein determining a corresponding bitrate for a set of encoded data comprises performing one or more read operations on the log file generated by the encoder.

15. The non-transitory computer-readable storage medium of claim 9, wherein the relationship is an equation.

16. The non-transitory computer-readable storage medium of claim 9, further comprising, prior to configuring the encoder, extracting a plurality of clips from the source data, wherein the encoder generates the sets of encoded data based on signal detail associated with the plurality of clips and each clip represents a predetermined length of time.

17. A system configured select a bitrate ladder for encoding source data, the system comprising:

a memory storing instructions;

a processor executing the instructions to:

select a set of parameter values for a quantization parameter;

for each parameter value, performing an encoding process that configures an encoder to encode source data to generate a set of encoded data while maintaining the quantization parameter at the parameter value;

for each set of encoded data, determining a value of a video quality metric and a corresponding bitrate;

derive a relationship between the video quality metrics and the corresponding bitrates;

determine, based on the relationship, a bucketing bitrate corresponding to a first video quality metric, wherein the first video quality metric is equal to a predetermined threshold;

determine that the bucketing bitrate falls within a bitrate range associated with a first bitrate ladder included in a plurality of bitrate ladders, wherein each bitrate ladder included in the plurality of bitrate ladders is associated with a different bitrate range and includes a different plurality of bitrate-resolution pairs;

select the first bitrate ladder for encoding the source data based on the bucketing bitrate falling within the bitrate range.

18. The system of claim 17, wherein configuring the encoder to encode source data while maintaining the quantization parameter at a given parameter value comprises setting an amount of signal detail to include in the encoded data.

* * * * *

UNITED STATES PATENT AND TRADEMARK OFFICE
CERTIFICATE OF CORRECTION

PATENT NO. : 10,404,986 B2
APPLICATION NO. : 14/673621
DATED : September 3, 2019
INVENTOR(S) : Anne Aaron et al.

Page 1 of 1

It is certified that error appears in the above-identified patent and that said Letters Patent is hereby corrected as shown below:

In the Claims

Column 14, Claim 17, Line 17, please delete "performing" and insert --perform--;

Column 14, Claim 17, Line 22, please delete "determining" and insert --determine--.

Signed and Sealed this
Seventeenth Day of December, 2019

Andrei Iancu
*Director of the United States Patent and Trademark Office*